United States Patent Office 3,099,652
Patented July 30, 1963

3,099,652
BENZOTHIAZOLEAZOPYRAZOLONE
DYE COMPOUNDS
James M. Straley, John G. Fisher, and Raymond C. Harris, Kingsport, Tenn., assignors to Eastman Kodak Company, Rochester, N.Y., a corporation of New Jersey
No Drawing. Filed Dec. 7, 1959, Ser. No. 857,487
7 Claims. (Cl. 260—147)

This invention relates to certain metallized and non-metallized benzothiazoleazopyrazolone compounds and their application for the dyeing or coloring of acrylonitrile polymers, especially polyacrylonitrile textile materials.

More particularly, the azo compounds of our invention consist of the monoazo compounds having the formula:

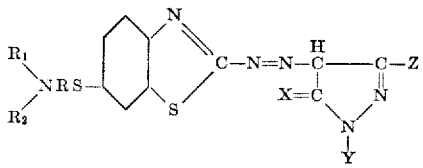

wherein R represents an alkylene radical having 2 to 3 carbon atoms, $R_1$ and $R_2$ each represents an alkyl radical having 1 to 4 carbon atoms and wherein

taken together represents a member selected from the group consisting of the morpholinyl and piperidyl radicals, X represents a member selected from the group consisting of an oxygen atom and the imino group, Y represents a member selected from the group consisting of a hydrogen atom the phenyl, chlorophenyl and tolyl radicals and Z represents a member selected from the group consisting of a methyl group, a low carbon carbalkoxy, the phenyl radical and the amino group and their metal complexes containing a metal selected from the group consisting of cobalt, nickel and chromium.

The non-metallized monoazo compounds of our invention are prepared by diazotizing a 2-aminobenzothiazole compound having the formula:

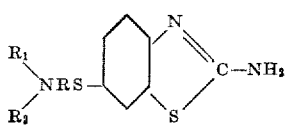

wherein R and $R_1$ have the meaning previously assigned to them and coupling the diazonium compound obtained with a pyrazolone compound having the formula:

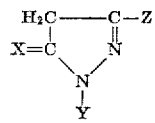

wherein X, Y and Z are as defined hereinbefore. The non-metallized azo compounds can be metallized either on or off the materials they color. Metallization can be carried out, for example, by heating the non-metallized azo compound with a solution or dispersion of the metallizing agent. In the metallized azo compounds of our invention, the metal and the monoazo compound are combined in the ratio of about one atom of metal to two molecules of the monoazo compound. The metallized azo compounds are referred to herein as 1:2 metal complexes. The manner in which metallization can be carried out is fully described hereinafter.

Nickel chloride, nickel bromide, nickel sulfate, nickel acetate, nickel formate, nickel thiocyanate [Ni(SCN)$_2$], cobaltous bromide, cobaltic chloride, cobaltous chloride, cobaltous acetate, cobalt thiocyanate [Co(SCN)$_2$], chromium trichloride, chromium tribromide, chromic sulfate, chromic acetate and chromium thiocyanate [Cr(SCN)$_3$], for example, are illustrative of the metallizing agents that can be employed.

Both the non-metallized and the metallized azo compounds of our invention can be applied to polyacrylonitrile textile materials in the form of an aqueous dispersion. Coloration can also be affected by incorporating the non-metallized or metallized azo compounds into the spinning dope, spinning the fiber as usual and converting the non-metallized azo compounds to their metallized form if desired. Also the metallizing agent can be incorporated in the spinning dope, the fiber spun as usual and then treated in a dyebath containing one or more of the non-metallized azo compounds to form the metal complex on the fiber.

The non-metallized monoazo compounds yield yellow shades on polyacrylonitrile materials. The metallized compounds yield fast yellow to orange shades on polyacrylonitrile materials, such as acrylic fibers. The metallized dyeings have better fastness to washing than the corresponding non-metallized dyeings and frequently have improved fastness to light. Among the acrylonitrile polymers that can be dyed or colored with the non-metallized and metallized azo compounds of our invention are those disclosed in Straley and Giles U.S. Patent 2,857,372, issued October 21, 1958.

2 - amino-6-β-dimethylaminoethylthiobenzothiazole, 2-amino-6-β-diethylaminoethylthiobenzothiazole, 2 - amino-6-β-di-n-propylaminoethylthiobenzothiazole, 2-amino-6-β-di-n-butylaminoethylthiobenzothiazole, 2-amino-6-γ-dimethylaminopropylthiobenzothiazole, 2 - amino - 6 - γ-diethylaminopropylthiobenzothiazole, 2 - amino-6-γ-di-n-propylaminopropylthiobenzothiazole, 2 - amino-6-γ-di-n-butylaminopropylthiobenzothiazole, 2 - amino - 6-(β-dimethylamino-α-methylethylthio)benzothiazole, 2-amino-6-(β - diethylamino-α-methylethylthio)benzothiazole, 2-amino-6-β-piperidylethylthiobenzothiazole, 2-amino-6-γ-piperidylpropylthiobenzothiazole, 2 - amino-6-β-morpholinylethylthiobenzothiazole and 2-amino-6-γ-morpholinylpropylthiobenzothiazole are illustrative of the 2-aminobenzothiazole compounds used in the preparation of the azo compounds of our invention.

The following examples illustrate the invention.

*Example 1*

2.8 grams of 2-amino-6-β-diethylaminoethylthiobenzothiazole were dissolved in 14 cc. of 96% sulfuric acid and 24 cc. of water and diazotized by the addition of 0.72 gram of sodium nitrite in 5 cc. of 96% sulfuric acid, with stirring, below 5° C. The reaction mixture was then stirred for two hours while maintaining the temperature below 5° C. after which it was slowly added to a solution of 1.64 gram of 1-phenyl-3-methyl-5-pyrazolone in 50 cc. of 2% aqueous sodium hydroxide while keeping the temperature below 10° C. by the addition of ice. The reaction mixture was allowed to stand for two hours without further cooling and then made neutral to Congo red paper by the addition of sodium carbonate. After neutralization, the reaction mixture was drowned in 1000 cc. of water and the dye compound which precipitated was recovered by filtration, washed well with cold water and air-dried. The dye compound thus obtained has the formula:

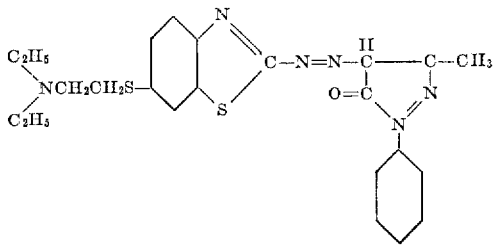

and dyes polyacrylonitrile fibers yellow shades.

*Example 2*

A polyacrylonitrile textile fabric dyed yellow with a 1% dyeing (by weight of pure dye) of the dye product of Example 1 was padded with a 3% aqueous solution of nickel thiocyanate under conditions such that a 60 to 100% pick up, based on the weight of the fabric, was obtained. The polyacrylonitrile fabric was then aged in a steam chest under 5 p.s.i. pressure for 10 minutes after which it was scoured at 60° C. with soap and water, rinsed well with water and dried. A 1:2 metal complex in which nickel and the monoazo compound of Example 1 are combined in the ratio of about one atom of nickel to two molecules of the monoazo compound is formed in situ on the polyacrylonitrile fabric being dyed. The polyacrylonitrile fabric was dyed a yellow shade having good fastness to light, washing and gas.

When the above example is repeated using a 3% aqueous solution of cobalt thiocyanate or chromium thiocyanate in place of the nickel thiocyanate solution, the polyacrylonitrile fabric is likewise dyed a yellow shade having good fastness to light, washing and gas. The 1:2 cobalt complex and the 1:2 chromium complex, respectively, of the monoazo compound of Example 1 are formed in situ on the polyacrylonitrile fabric being dyed.

*Example 3*

2.93 grams of 2-amino-6-γ-diethylaminopropylthiobenzothiazole were diazotized and the diazonium compound obtained was coupled with 0.98 gram of 3-methyl-5-pyrazolone. Diazotization, coupling and recovery of the dye compound formed were carried out in accordance with the procedure set forth in Example 1. The dye compound obtained dyed polyacrylonitrile yellow shades.

When the dye compound of this example is applied to a polyacrylonitrile textile fabric and converted to its nickel, cobalt or chromium complex, yellow shades which are fast to light, washing and gas are obtained. In each instance a 1:2 metal complex is formed in situ on the polyacrylonitrile fabric being dyed.

*Example 4*

2.93 grams of 2-amino-6-β-piperidylethylthiobenzothiazole were diazotized and coupled with 1.56 gram of 3-carbethoxy-5-pyrazolone. Diazotization, coupling and recovery of the dye compound formed were carried out in accordance with the procedure set forth in Example 1. The dye compound obtained dyes polyacrylonitrile textile fabrics yellow shades. In each instance a 1:2 metal complex is formed in situ on the polyacrylonitrile fabric being dyed.

When the dye compound of this example is applied to a polyacrylonitrile textile fabric and converted to its nickel, cobalt or chromium complex, yellow shades which are fast to light, washing and gas are obtained.

*Example 5*

One gram of the non-metallized monoazo dye compound of Example 1, 15 cc. of acetone and 2 cc. of 28% aqueous ammonium hydroxide were refluxed together and a solution of 0.7 gram of Ni(OOCCH$_3$)$_2$·4H$_2$O in 15 cc. of 50% aqueous acetone were added over a period of 15 minutes. Refluxing was continued for three hours after which the reaction mixture was poured into 400 cc. of water and the temperature brought to 80° C. 10 grams of sodium chloride were added, with stirring, and then the reaction mixture was cooled to room temperature. The metallized dye product, a 1:2 nickel complex in which nickel and the monoazo compound of Example 1 are combined in the ratio of about one atom of nickel to two molecules of the monoazo compound, which precipitated was recovered by filtration, washed with a 2% aqueous sodium chloride solution and air-dried. It colors polyacrylonitrile textile materials yellow shades which have good fastness to light, washing and gas.

*Example 6*

Example 1 was repeated using 1.64 gram of 1-phenyl-3-methyl-5-iminopyrazolone in place of 1-phenyl-3-methyl-5-pyrazolone. The dye compound obtained dyed polyacrylonitrile textile fabrics yellow shades. When it is metallized on the polyacrylonitrile fiber, with nickel, cobalt or chromium thiocyanate, for example, yellow shades fast to light, washing and gas are obtained. In each instance a 1:2 metal complex is formed in situ on the polyacrylonitrile fabric being dyed.

*Example 7*

Example 1 was repeated using 2.66 grams of 2-amino-6-β-dimethylamino-α-methylethylthiobenzothiazole in place of 2-amino-6-β-diethylaminoethylthiobenzothiazole. The dye compound obtained dyed polyacrylonitrile textile fabrics yellow shades. When the non-metallized dyeing is converted to its nickel, cobalt or chromium form yellow shades having excellent fastness to light, gas and washing are obtained. In each instance a 1:2 metal complex is formed in situ on the polyacrylonitrile fabric being dyed.

*Example 8*

4.52 grams of the dye of Example 7 were added in small portions to 5.4 grams of CrCl$_3$·6H$_2$O in 50 cc. of ethylene glycol at 140° C. The reaction mixture was stirred at 140° C. for 1 hour longer, cooled to 80° C. and then poured into 110 cc. of a 20% aqueous NaCl solution. The reaction mixture was filtered and the solid collected on the filter was sucked as dry as possible and the filtrate made basic with 10% NH$_4$OH. The 1:2 chromium complex of the dye of Example 7 which precipitated was recovered by filtration, washed with a dilute aqueous sodium chloride solution and air-dried. It yields orange shades on polyacrylonitrile textile materials made of Verel or Orlon 42 acrylic fibers which have good fastness, for example, to light, gas and washing.

*Example 9*

2.95 grams of 2-amino-6β-morpholinylethylthiobenzothiazole were diazotized and the diazonium compound obtained was coupled with 0.98 gram of 3-methyl-5-pyrazolone. Diazotization, coupling and recovery of the dye compound formed were carried out in accordance with the procedure set forth in Example 1. The dye compound obtained dyed polyacrylonitrile yellow shades. In each instance a 1:2 metal complex is formed in situ on the polyacrylonitrile fabric being dyed.

When the dye compound of this example is applied to a polyacrylonitrile textile fabric and converted to its nickel, cobalt or chromium complex, yellow shades which are fast to light, washing and gas are obtained.

The following tabulation further illustrates the azo compounds of our invention and sets forth (1) the colors the non-metallized azo compounds yield on polyacrylonitrile textile fabrics made of Verel or Orlon 42 acrylic fiber and (2) the colors obtained when the non-metallized dyeings are metallized with nickel thiocyanate to obtain the 1:2 nickel complex in situ on the polyacrylonitrile textile material being dyed. "Original" refers to the non-metallized dyeing and "Final" refers to the metallized dyeing.

| 2-Aminobenzothiazole Compound | Coupler | Color | |
|---|---|---|---|
| | | Original | Final |
| 6-β-dimethylamino-ethylthio. | 1-phenyl-3-methyl-5-pyrazolone. | yellow | yellow. |
| 6-γ-dimethylamino-propylthio. | do | do | Do. |
| 6-γ-diethylamino-propylthio. | do | do | Do. |
| 6-γ-di-n-propylamino-propylthio. | 3-methyl-5-pyrazolone. | do | Do. |
| 6-β-di-n-butylamino-ethylthio. | 1,3-diphenyl-5-pyrazolone. | do | Do. |
| 6-β-dimethylamino-ethylthio. | 1-m-chlorophenyl-5-pyrazolone. | do | Do. |
| Do | 1-p-methylphenyl-3-methyl-5-pyrazolone. | do | Do. |
| 6-β-morpholinyl-ethylthio. | 3-phenyl-5-pyrazolone. | do | Do. |
| 6-γ-morpholinyl-propylthio. | 1-phenyl-3-methyl-5-pyrazolone. | do | Do. |
| 6-γ-piperidyl-propylthio. | do | do | Do. |
| 6-β-piperidyl-ethylthio. | 1-phenyl-3-methyl-5-iminopyrazolone. | do | Do. |
| 6-β-dimethylamino-ethylthio. | 3-methyl-5-imino-pyrazolone. | do | Do. |
| Do | 3-phenyl-5-iminopyrazolone. | do | Do. |

Metallization can also be effected with a suitable cobalt or chromium metallizing agent, especially cobalt thiocyanate and chromium thiocyanate, to form the 1:2 cobalt and 1:2 chromium complexes of the non-metallized azo compounds disclosed in the tabulation just given. As previously noted metallization can be effected either on or off the fiber.

The 2-aminobenzothiazole compounds used in preparing the azo compounds of our invention can be prepared by reacting the hydrochloride salt form of a compound having the formula:

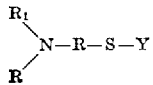

wherein R, R$_1$, R$_2$ and

(taken together) have the meaning previously assigned to them and Y represents a chlorine or bromine atom with 2-amino-6-mercaptobenzothiazole or its alkali metal salts. The non-salt form of the compounds having the formula just given can be employed but inasmuch as these compounds are more easily prepared in their salt form, such as the hydrochloride salt form, the use of the hydrochloride salt form is shown in the examples illustrating the preparation of the 2-aminobenzothiazole intermediate compounds.

The 2-aminobenzothiazole compounds are new compounds. They are described and claimed in copending Straley and Fisher U.S. application Serial No. 2,869, filed January 18, 1960, now abandoned.

2-amino-6-mercaptobenzothiazole is a known compound. It can be prepared by reacting 2-amino-6-thiocyanobenzothiazole with sodium sulfide. As shown hereinafter the 2-amino-6-mercaptobenzothiazole thus formed can be used, in situ, without being separately isolated.

Example 10

68.4 grams of 2-amino-6-thiocyanobenzothiazole, 160 grams of Na$_2$S·9H$_2$O and 700 cc. of water were refluxed together for ten minutes. A solution of 57.1 grams of the hydrochloride of γ-dimethylaminopropyl chloride

and 27.8 grams of NaHCO$_3$ in 400 cc. of water was added over a period of about 15 minutes. Refluxing was continued for one hour further after which the reaction mixture was allowed to stand overnight. The reaction product which precipitated was recovered by filtration, washed with cold water and air-dried. 69.4 grams of 2-amino-6-γ-dimethylaminopropylthiobenzothiazole having the formula:

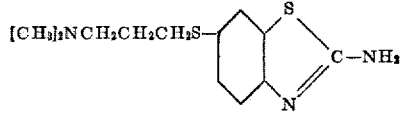

and melting at 113.5–116° C. were thus obtained.

Example 11

Example 10 was repeated using 57.8 grams of 2-diethylaminoethyl chloride hydrochloride in place of γ-dimethylaminopropyl chloride hydrochloride. 71 grams of 2-amino-6-β-diethylaminoethylthiobenzothiazole melting at 92–94° C. were obtained.

Example 12

Example 10 was repeated using 52.8 grams of 2-dimethylaminoethyl chloride hydrochloride in place of γ-dimethylaminopropyl chloride hydrochloride. 2-amino-6-β-dimethylaminoethylthiobenzothiazole melting at 110–112° C. was obtained.

Example 13

The general procedure set forth in Example 10 was followed using β-dimethylamino-α-methylethyl chloride hydrochloride in place of γ-dimethylaminopropyl chloride hydrochloride. 2-amino-6-β-dimethylamino-α-methylethylthiobenzothiazole was obtained as a gummy solid.

Example 14

The general procedure set forth in Example 10 was followed using β-piperidylethyl chloride hydrochloride in place of γ-dimethylaminopropyl chloride hydrochloride. 2-amino-6-β-piperidylethylthiobenzothiazole having the formula:

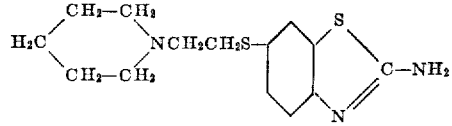

was obtained as a solid melting at 78–81° C.

Example 15

The general procedure set forth in Example 10 was followed using β-morpholinylethyl chloride hydrochloride in place of γ-dimethylaminopropyl chloride hydrochloride. 2-amino-6-β-morpholinylethylthiobenzothiazole was obtained as a solid melting at 71–73° C.

Example 16

The general procedure set forth in Example 10 was followed using γ-diethylaminopropyl chloride hydrochloride in place of γ-dimethylaminopropyl chloride hydrochloride. 2-amino-6-γ-diethylaminopropylthiobenzothiazole was obtained as a solid melting at 82–84° C.

Example 17

The general procedure set forth in Example 10 was followed using γ-di-n-propylaminopropyl chloride hydrochloride in place of γ-dimethylaminopropyl chloride hydrochloride. 2-amino-6-γ-di-n-propylaminopropylthiobenzothiazole was obtained as a gummy solid.

Example 18

The general procedure set forth in Example 10 was followed using β-di-n-butylaminoethyl chloride hydrochloride in place of γ-dimethylaminopropyl chloride hydrochloride. 2-amino-6-β-di-n-butylaminoethylthiobenzothiazole was obtained as a gummy solid.

The non-metallized and metallized azo compounds of our invention can be applied to acrylonitrile polymers, such as polyacrylonitrile and acrylonitrile graft polymers, in the form of an aqueous dispersion.

The following example illustrates one satisfactory way in which the non-metallized azo compounds can be used to dye an acrylonitrile polymer textile material. 0.1 gram of dye is dissolved by warming in 5 cc. of methyl Cellosolve. A 2% aqueous solution of a nonionic surfactant, such as Igepal CA (a polymerized ethylene oxide-alkyl-phenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried. The metallized dyeing can be obtained in accordance with the procedure described in Example 2. A 3% solution of a salt, other than the thiocyanate salt, can be used. However, we have found the use of the thiocyanates of nickel, cobalt and chromium to be particularly advantageous.

The premetallized azo dyes can be applied in the same general manner as the non-metallized azo dyes. However, in order to mitigate the possibility of demetallization during dyeing 5 cc. of a 5% aqueous solution of a weak acid such as boric acid is used instead of formic acid or acetic acid. Except for this change the dyeing conditions are the same.

The non-metallized and metallized azo compounds of our invention are devoid of water solubilizing groups such as the carboxylic acid and the sulfonic acid groups. Any other suitable method known to the art can be used to apply them to acrylonitrile polymeric materials.

The dyeings obtained with the chromium complexes of our invention tend to be redder than those obtained with the nickel and cobalt complexes.

The invention has been described in detail with particular reference to preferred embodiments thereof, but it will be understood that variations and modifications can be effected within the spirit and scope of the invention as described hereinabove and as defined in the appended claims.

We claim:
1. The azo compounds selected from the group consisting of the monoazo compounds, devoid of a water-solubilizing group, having the formula:

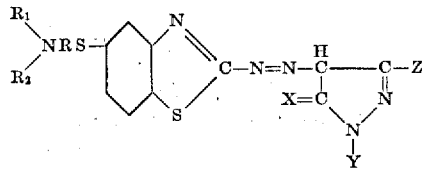

wherein R represents an alkylene radical having 2 to 3 carbon atoms, $R_1$ and $R_2$ each represents an alkyl radical having 1 to 4 carbon atoms and wherein

taken together represents a member selected from the group consisting of the morpholinyl and piperidyl radicals, X represents a member selected from the group consisting of an oxygen atom and the imino group, Y represents a member selected from the group consisting of the phenyl, chlorophenyl and tolyl radicals and Z represents a member selected from the group consisting of a methyl group and the amino group and the 1:2 nickel complex thereof.

2. The monoazo compounds having the formula:

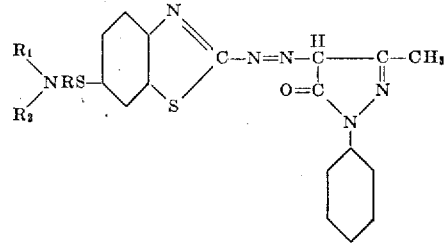

wherein R represents an alkylene radical having 2 to 3 carbon atoms and $R_1$ and $R_2$ each represents an alkyl radical having 1 to 4 carbon atoms.

3. The azo compound having the formula:

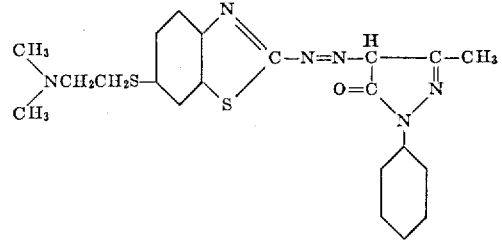

4. The azo compound having the formula:

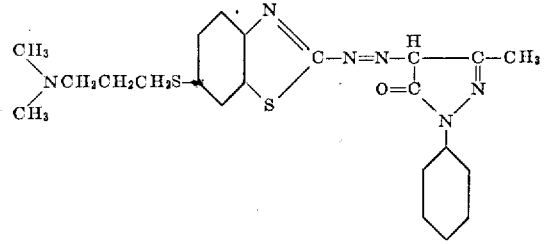

5. The 1:2 nickel complex of the azo compound set forth in claim 4.

6. The azo compound having the formula:

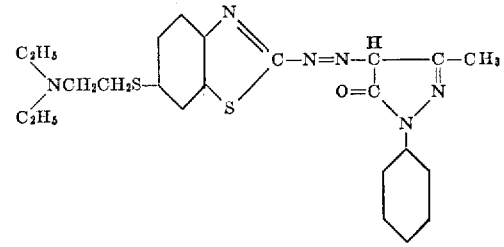

7. The 1:2 nickel complex of the azo compound set forth in claim 6.

References Cited in the file of this patent
UNITED STATES PATENTS

| | | |
|---|---|---|
| 2,128,256 | Krzikalla et al. | Aug. 30, 1938 |
| 2,402,538 | Dreyfus | June 25, 1946 |
| 2,832,761 | Straley et al. | Apr. 29, 1958 |
| 2,916,482 | Straley et al. | Dec. 8, 1959 |

UNITED STATES PATENT OFFICE
CERTIFICATE OF CORRECTION

Patent No. 3,099,652            July 30, 1963

James M. Straley et al.

It is hereby certified that error appears in the above numbered patent requiring correction and that the said Letters Patent should read as corrected below.

Column 7, lines 52 to 58, the formula should appear as shown below instead of as in the patent:

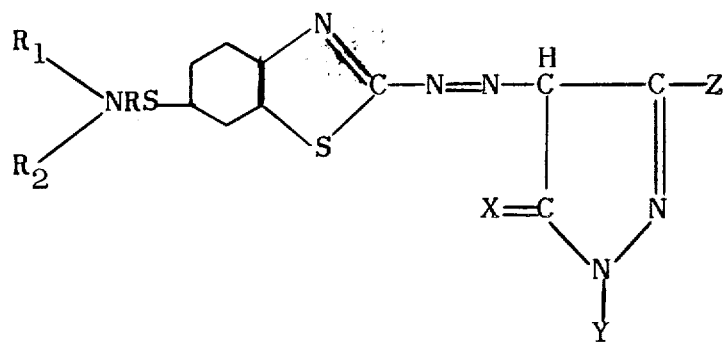

Signed and sealed this 7th day of April 1964.

(SEAL)
Attest:
ERNEST W. SWIDER
Attesting Officer

EDWARD J. BRENNER
Commissioner of Patents